Oct. 6, 1964    L. G. SAMPSON    3,152,030
FUSED POLY-LAMINATE ADHESIVE TAPE AND METHOD OF MAKING SAME
Filed June 15, 1959

INVENTOR
Lorne G. Sampson
By
Ooms, McDougall, Williams & Hersh
Attorneys

United States Patent Office 3,152,030
Patented Oct. 6, 1964

3,152,030
FUSED POLY-LAMINATE ADHESIVE TAPE AND
METHOD OF MAKING SAME
Lorne G. Sampson, Skokie, Ill., assignor, by mesne assignments, to Mystik Tape, Inc., a corporation of Illinois
Filed June 15, 1959, Ser. No. 820,398
6 Claims. (Cl. 156—278)

The present invention relates generally to the manufacture of pressure sensitive adhesive tapes and more particularly to a unique method of preparing and novel structure for polyfilm backed cloth based pressure sensitive adhesive tapes.

Heretofore it has been known to coat a cloth sheet with a thermoplastic polyfilm, such as polyethylene, to provide an article having the dual function of backing and release coat which is then usable in the fabrication of pressure sensitive adhesive tapes.

The traditional methods for preparing such thermoplastic coated cloth, that is, a cloth fabric having a layer of thermoplastic partially embedded therein, are to deposit either extruded or hot melt polyethylene upon one surface of the cloth and thereafter to cool the coated cloth.

The impregnated and coated cloths prepared by these methods, while possessing desirable properties for certain uses, are grossly deficient of other equally desirable properties. Consequently these tapes are unsuited for a number of applications where a tape having a thermoplastic backing would otherwise be quite desirable.

More specifically, the tapes prepared according to prior art processes, which tapes shall herein be called "polycoated tapes," are grossly deficient in barrier properties. Thus a polycoated tape having 29 pounds of polyethylene per ream of tape, an excellent coating in the standards of the prior art, was tested for vapor transmission over a period of 24 hours with a vapor pressure difference of about six inches of mercury and was found to permit the transmission of 1.8 grams of moisture per 100 square inches of tape. In contrast, the manufactured tapes according to the present invention permit the transmission of but 0.7 gram of moisture per 100 square inches of tape under identical conditions thereby completely rewriting the standard of excellence for this type of tape.

Furthermore, polycoated cloths are deficient in physical strength. As is known, the cloth in cloth tapes provides practically all of the strength properties which the tape possesses. These properties are traditionally measured as tear strength, burst strength and tensile strength. All of these strengths are conventionally determined as the ultimate strength, that is the pounds of force which can be resisted by the tape just before breakage occurs. With cloth tapes, therefore, tensile strength is inherently a function of the tear strength and vice versa. But with polycoated tapes, the polyethylene is embedded between the several strands of the cloth causing the individual strands of cloth to be locked in position relative to each other. With locked or rigid strands, the tear strength of the cloth is greatly reduced. This is because the strands, being locked, cannot move and distribute the stresses.

Two tapes of equal plastic weight and identical count print cloth were prepared, one being a polycoated tape, the other manufactured according to the present invention. The polycoated cloth tape had a tensile strength of 34 pounds per inch and a tear strength of 344 Elmendorf units. In contrast, the tape of this invention had a tensile strength of 52 pounds per inch and a tear strength of 528 Elmendorf units.

Further, the polycoated tapes possess greatly reduced flexibility and conformability, again believed to result from the locked threads which cannot "give" and which inherently characterized such tapes, when compared to the tape of the present invention in several identical applications.

Still other problems arise from the nature of the materials themselves.

Thus, when adhesives are laid on cloth from solvent solutions, the coated web must be dried in an oven. Further, if adhesive is applied to both sides of the cloth web, the subsequent handling of the coated web is quite complicated. Handling, of course, is much less complicated if the adhesive is exposed on one side of the web only and a reusable liner or carrier is used to cover the other adhesive coated side of the web. It would be still cheaper if the plastic film, which is a part of the final product, could be used as the liner. However, the use of polyethylene film in the fashion with drying involves heat and diffusion of solvents and, as such, demands special techniques not presently known to the art.

For example, it is practically impossible, under ordinary conditions, to run a web or polyethylene and cloth through an oven after coating with a solvent adhesive. The combination of the drying heat and the diffusion of the solvent from the adhesive into the polyethylene film causes the film to distort into a very wrinkled pattern. These wrinkles remain even though the finished tape is wound up tightly and cause the polyethylene to separate from the laminating adhesive.

The present invention overcomes the aforementioned deficiencies in the structures and in the manufacturing of the polycoated cloth based tapes of the prior art and obtains the remarkable results above indicated by bringing a totally now concept to the art of manufacturing thermoplastic backed, cloth based, pressure sensitive adhesive tapes. Essentially, the present invention resides in a new processing technique, herein called the "fusion" technique; a processing sequence utilizing the technique; and a tape structure, resulting therefrom, all of which are hereinafter described in detail.

It is, accordingly, one of the prime objects of the present invention to provide new and improved pressure sensitive adhesive tapes of the type described and methods of preparing such tapes which overcome the disadvantages of the polycoated cloth tapes of the prior art and provide remarkably unexpected improvements in the physical characteristics and properties of such tapes when compared to those polycoated cloth tapes.

Another object of the present invention is to provide a new laminated tape structure having barrier properties, physical strength, flexibility and conformability characteristics remarkably enhanced over those of the polycoated tapes.

Another object of the present invention is to provide polyfilm backed cloth bases pressure sensitive adhesive tapes in which the individual strands in the cloth retain their natural ability to freely respond to and transmit forces placed thereupon.

Another object of the present invention is to provide a new method of manufacturing polyfilm backed cloth based pressure sensitive adhesive tapes in which a preformed thermoplastic film is formed into a laminated structure to provide a carrier member in the processing thereof and a barrier layer in the product resulting therefrom.

Still another object of the present invention is to provide a new method of manufacturing polyfilm backed cloth bases pressure sensitive adhesive tapes in which a preformed thermoplastic film is wound in upon a dried rubber like laminating adhesive and thereafter fused thereto and which avoids the complications attendant the extrusion or hot melt depositing of thermoplastics and the impregnation of the cloth base heretofore plaguing the art.

These and still other objects as shall hereinafter appear are fulfilled by the present invention in a manner readily discerned from the following detailed description of a tape structure and process exemplifying the present invention, particularly when read in conjunction with the accompanying drawing, in which—

Figure 1:
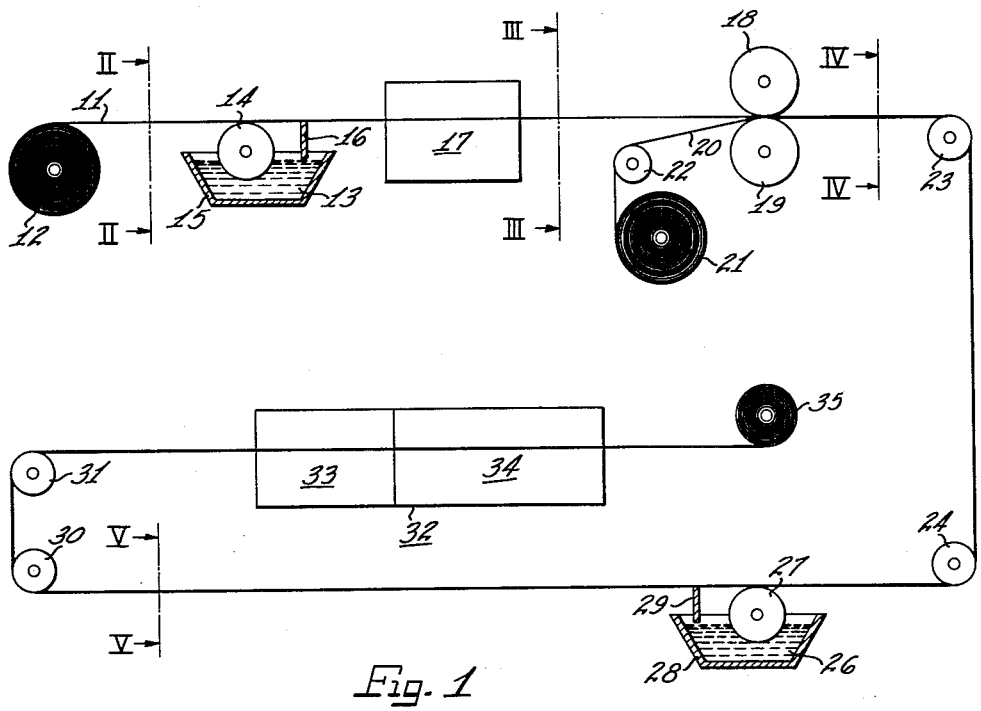
FIG. 1 is a schematic showing of a process embodying the present invention.
Figure 2:
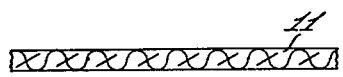
FIG. 2 is an enlarged fragmentary cross-section taken at line II—II of FIG. 1.

Referring to FIG. 1 of the drawing which schematically illustrates the manufacture of a pressure sensitive adhesive tape by a practice embodying the present invention, a sheet of a cloth fabric 11 (also see FIG. 2) is drawn from a let-off or supply roll 12 by any suitable means such, for example, as a driven governor roll assembly (not shown) or the like.

As the fabric 11 passes from supply roll 12, one surface of the fabric is coated with a suitable laminating adhesive 13, as shall be hereinafter more fully described, by suitable means such, for example, as the roller 14 in the supply pan 15 controlled by the doctor blade 16.

Figure 3:
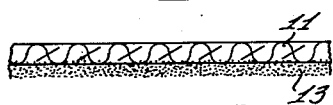
FIG. 3 is an enlarged fragmentary cross-section taken along lines III—III of FIG. 1.

The fabric 11 thus coated on one surface thereof with a layer of the laminating adhesive 13 next passes through a drier 17, to dry the adhesive on the fabric by dispelling the excess solvent therefrom, and from the drier into laminating rolls 18 and 19. The sheet entering the laminating rolls is of the form shown in FIG. 3. In the laminating rolls 18, 19, the dried layer of laminating adhesive 13 is engaged with a sheet of polyfilm such, for example, as polyethylene film 20, which is suitably drawn from a let-off or supply roll 21 and about a guide roll 22 into the laminating rolls 18, 19.

Figure 4:
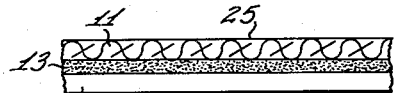
FIG. 4 is an enlarged fragmentary cross-section taken along lines IV—IV of FIG. 1.

The laminated structure, comprising the sheet of fabric 11 and polyethylene 20 having the dried layer of laminating adhesive 13 intimately interposed therebetween (see FIG. 4), is next moved in any suitable fashion such, for example, as by appropriately positioned guide rolls 23, 24, to present the free surface 25 of the fabric 11 for coating with a layer of a suitable pressure sensitive adhesive 26 by suitable means such, for example, as the roller 27 in the supply pan 28 controlled by the doctor blade 29. The sheet thus assumes the appearance shown in FIG. 5.

The laminated structure is next suitably guided such, for example, as by guide rolls 30, 31, shown positioned to peripherally engage and carry the polyethylene sheet 20 of the structure to avoid smearing the pressure sensitive adhesive 26, into an oven 32 having first and second heating zones 33, 34, respectively. In zone 33, the entire structure is rapidly heated until the polyethylene sheet 20 fuses and becomes annealed. During this heating the solvent is rapidly dried from the pressure sensitive adhesive 26 and any solvent which may have diffused into the polyethylene sheet 20 similarly is driven therefrom. Thereafter, the structure passes into zone 34 where it is cooled to and maintained at normal processing temperature levels. Shortly after entry into zone 34, the soft fused polyethylene 20 again becomes a tough plastic coating.

After treatment in zones 33, 34, the annealed polyethylene film is found to be substantially completely stress relieved and to conform completely to the fabric 11 without distortion or wrinkling.

The annealed tape structure, upon withdrawal from oven 32, is fed to a suitable means for storing the laminated sheets such, for example, as take-up roll 35.

The tape on the take-up roll 35 can then be stored until needed or further cut in such widths and rewound in such lengths as may be commercially desired.

While the foregoing describes a tape structure manufactured with a film of polyethylene, it has been found that any of the well known polyfilms, that is, film forming thermoplastics, may be employed in processes embodying the present invention with equally satisfactory results being obtained therefrom.

In another practice of the present invention, a laminating adhesive is first applied to 64 × 56 gray goods first by a floating blade and then by a knife and fountain. The coated fabric is then dried at a moderate temperature, and just ahead of the windup, the treated side (top side) of 2 mil type C-1 polyethylene film (available under the trademark "Visqueen" from the Visking Division of the Bakelite Division of Union Carbide and Carbon Company) is rolled into the coated gray goods next to the laminating adhesive. It is found that the use of fairly high tension on the windup assists in the lamination, although it is quite important that the polyethylene film is introduced into the windup without stretching the film. If the film is laminated with residual tension present in it, slight curling of the finished tape occurs on unwind.

The laminated structure of cloth and polyethylene film may either be stored for future use or may be immediately used to manufacture an adhesive tape.

When the laminated structure is immediately processed to manufacture a pressure sensitive adhesive tape, as is the case in the processing chosen to exemplify the present invention, the uncoated or exposed cloth surface of the laminated structure is coated with a suitable pressure sensitive adhesive. The pressure sensitive adhesive may be coated as a one-step operation as previously described or may be coated in two steps.

An example of a two-step procedure which has been found to provide excellent results comprises applying about 20 pounds of pressure sensitive adhesive per ream of fabric and then passing the thus coated structure through a low temperature drier. The low temperature of this drier is significant since it prevents creping of the tempered polyethylene film. Contact of the laminated structure with naphtha should also be avoided because it is found that naphtha will also cause the polyethylene film to crepe.

Next, the balance of the pressure sensitive adhesive, about 50 pounds per ream of fabric, is spread on as with a fountain and the entire structure is introduced into an oven or oven zone having a temperature in excess of the fusion temperature of the polyethylene. This rapid heating, the oven is already at temperature when the structure is introduced thereinto, softens the tempered polyethylene film before the solvent diffuses to it. This has the added, and totally unexpected advantage, of further preventing the creping of the film.

In passing through the first oven or oven zone, if a thermally partitioned single unit of the type illustrated, in FIG. 1 is employed, care should be exercised to see that little or no contact occurs between the polyethylene side of the web and rollers or other obstructions because, when in the fused state, the polyethylene is very soft and easily defaced.

After passing through the zone of high heat, the laminated structure is introduced into a second oven, or second oven zone, which is headed to a normal temperature for drying the pressure sensitive adhesive. It is the only requirement of this zone that its temperature be adequate to dispel remaining excess solvent from the adhesive layer. As these lower temperatures the polyethylene film, which upon cooling has reassumed its tough plastic film-like condition, can be handled over rolls and the like without fear of defacing its surface.

Other practices employing the key concepts herein described may be readily deduced from this teaching yet fall within the present invention. Thus, processes embodying the concepts of introducing a polyethylene film to a laminating adhesive without residual tension or wrinkling in a tight windup; drying the first coat of a pressure sensitive adhesive in a two-coat process at a low temperature to avoid creping the polyfilm; and directly, after applying the second coat of pressure sensitive adhesive (in a two-step process) or the coat (in a one-step process), heating the coated laminated structure to a temperature above the fusion temperature of the polyfilm to soften and detemper the polyfilm and thereafter cooling the structure to provide a laminated structure having fused polyethylene therein; are considered to fall within and to employ the contributions made to the art by the present teaching.

While the foregoing methods have utilized certain specific techniques for coating the various layers of adhesive on the fabric web, it is of course understood that other of the conventional techniques for coating base sheets with solvent adhesives may likewise be employed without departing from the spirit of the present invention. Thus roller coating, doctor blading, spraying, brushing and the like are all suitable methods for placing the adhesive layers upon the web.

Figure 5:
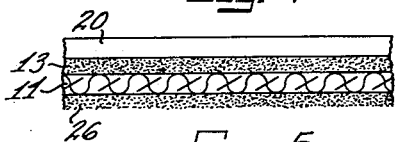
FIG. 5 is an enlarged fragmentary cross-section taken along line V—V of FIG. 1.

The novel structure of the present invention corresponds, in relative position, to the manufacturing stage illustrated in FIG. 5.

Thus the tape, commencing with top as illustrated, comprises a fused detempered polyfilm 20, such, for example, as polyethylene, polyethylene derivatives, polypropylene and derivatives thereof, and like fusible film forming thermoplastics, which provides a backing having excellent barrier and release coat properties, as previously described.

A particularly fine backing was prepared using a 2 mil low density polyethylene film which is treated on one side by an oxidation process such, for example, as is achieved by flame or electron bombardment and the like. When using a previously processed film, care should be exercised to place the processed side in engagement with the laminating adhesive layer where it affords an excellent bonding surface. Typical of such a film is the Visqueen type C–1 previously described.

High density polyethylene (manufactured by the low pressure processes) has been found to also provide a good backing in accordance with the present invention.

Either colored or clear polyethylene may be employed in this tape although when clear polyethylene is used, the color characteristics of the tape will be derived from the pigmentation of the laminating adhesive.

Adjacent the layer of fused polyfilm 20 is a layer of laminating adhesive 13. The adhesive may be either colored or uncolored and will determine the back color of the tape if the polyfilm is clear. In fabricating the laminated structure, it is found that a stabilized rubber and resin combination provides an excellent adhesive for use as the laminating adhesive. Generally, two knife coats or the equivalent thereof will provide sufficient adhesive in the practice of this invention although the quantity may be varied depending upon the consistency of the adhesive formulation and the fabric web employed. It has been found that good results are obtained using about 70 pounds adhesive to 55 pounds of cloth.

Representative of adhesive formulations found to be satisfactory in the practice of this invention are the following.

EXAMPLE 1

| Ingredient: | Parts by weight |
|---|---|
| Polystar 301 | 100 |
| Titanox RANC | 25 |
| Hi Sil | 5 |
| S–115 resin | 10 |
| Mineral oil | 25 |
| Pentalyn H | 20–60 |
| Polystyrene | 20 |

EXAMPLE 2

| Ingredient: | Parts by weight |
|---|---|
| Polystar | 100 |
| Titanox RANC | 25 |
| Hi Sil | 5 |
| S–115 resin | 10 |
| Mineral oil | 35 |
| Pentalyn H | 60 |
| Polystyrene | 30 |

EXAMPLE 3

| Ingredient: | |
|---|---|
| Smoke sheet, natural rubber | 100 |
| Santovar A (2,5,-di-tert. amylhydroquinone) | 2 |
| Sulphur | 4 |
| Zinc oxide | 50 |
| Neoprene WRT (polychloroprene rubber) | 100 |
| Magnesium oxide | 5 |
| Yellow iron oxide | 12 |
| Carbon black | 3 |
| Pentalyn H (pentaerythritol ester of hydrogenated rosin) | 130 |
| Naphtha | 340 |
| Toluene | 340 |

EXAMPLE 4

| Ingredient: | |
|---|---|
| G.R.I. | 100 |
| Mapico yellow lemon | 12 |
| ZnO | 5 |
| G.M.F. as 33% in clay | 6 |
| Sulfur | 1.5 |
| $PbO_2$ | 4 |
| Petrolene | 235 |

EXAMPLE 5

| Ingredient: | |
|---|---|
| Butyl rubber | 100 |
| Imperial chrome yellow | 10 |
| ZnO | 5 |
| Carbon black | 3 |
| G.M.F. as 33% in clay | 6 |
| Sulfur | 2 |
| Petrolene | To 452 |
| Pentalyn H | 75 |

Structurally adjacent the layer of laminating adhesive 13 is the fabric base 11. Generally any untreated cotton textile or like woven web can be used in the practice of this invention. Particularly satisfactory results have been obtained using untreated cotton having a count of about 68×70 and excellent results are obtained using gray goods having a count of 64×56. Many other materials, similar to these, are readily available and may be used if desired.

Finally, adjacent the under surface (relative to the drawing) of the fabric is a layer of a suitable pressure sensitive adhesive 26.

The practice of the present invention is not intended to be limited to any specific pressure sensitive adhesive and any of the well known formulations characterized by sufficient cohesion relative to its adhesion with surfaces upon which it is applied, and by sufficient unit with the fabric base sheet so that the sheets may be rolled or stacked upon themselves without offsetting either upon separation or upon unwinding for use. Suitable compounds possessing these characteristics include those solvent adhesive containing either natural rubber, synthetic rubber, rubber derivatives, polyisobutylene, ethyl cellulose, nitrocellulose, polymeric resins or the like as cohesive agents; ester gum, hydrogenated rosin, hard cumars, alkyds, pitch rosin, toluene-sulfonamide-formaldehyde, hydrogenated cumarone-indene resins or other coal tar resins and the like as adhesive agents; methyl abietate, soft alkyds, soft cumars, dibutyl phthalate, diethyl phthalate, chlorinated diphenyl, tricresyl phosphate, wood rosin and its glycal ester, or the like as plasticizers; and which may contain hydrogenated waxes, vegetable and animal waxes, mineral waxes or the like as modifiers.

It is of course understood that insofar as the present invention is concerned, any of the above or any other pressure-sensitive adhesive having no chemical affinity for the fused polyfilm of this invention, may be incorporated into the manufacture herein described.

The following are examples of clear and colored pressure-sensitive adhesives which also may be employed in the practice of this invention.

EXAMPLE 6

| Ingredient: | Parts by weight |
|---|---|
| Pale crepe rubber | 80 |
| Butadiene-styrene copolymer (GR-S 1022) | 20 |
| Polybeta pinene (Piccolyte S-115) | 60 |
| Alkylated polyhydroxyl phenol | 1 |
| Hydrogenated rosin (Staybelite Ester #10) | 30 |
| Titanium dioxide | 25 |
| Heptane | 645 |

EXAMPLE 7

| Ingredient: | |
|---|---|
| Pale crepe rubber | 80 |
| Butadiene-styrene copolymer (GR-S 1022) | 20 |
| Polybeta pinene (Piccolyte S-115) | 60 |
| Hydrogenated rosin (Staybelite Ester #10) | 5 |
| Titanium dioxide | 25 |
| Toluol | 650 |

EXAMPLE 8

| Ingredient: | |
|---|---|
| Pale crepe rubber | 80 |
| Butadiene-styrene copolymer (GR-S 1022) | 20 |
| Polybeta pinene (Piccolyte S-115) | 60 |
| Hydrogenated rosin (Staybelite Ester #10) | 10 |
| Pigment | 10 |
| Benzoyl | 650 |

EXAMPLE 9

| Ingredient: | |
|---|---|
| Smoked rubber sheet | 20 |
| Cumarone-indene resin | 4 |
| Zinc oxide | 1 |
| Benzol | 225 |

EXAMPLE 10

| Ingredient: | |
|---|---|
| GR-S 16 (butadiene-styrene polymer) | 12 |
| Hydrogenated rosin (Staybelite Ester #10) | 8 |
| Heptane | 80 |

EXAMPLE 11

| Ingredient: | |
|---|---|
| Smoked rubber sheet | 10 |
| Zinc oxide | 8 |
| Mineral oil | 4 |
| Benzol | 66 |

It is further understood that the specific setup described for applying the pressure-sensitive adhesive on the fabric web is merely exemplary and that any of the conventional coating techniques may be employed in the aforedescribed processes with satisfactory results.

It thus becomes apparent that the structure, technique and processing herein described and illustrated provides complete satisfaction of the aforestated objects in a unique and novel manner.

In addition to the aforesaid features, it is further found that the tape structure thus formed has substantially no transfer on unwind, is colorfast and will not fade, has low temperature adhesion, is resistant to oil and accelerated aging and is further possessed with physical properties at least equal to and generally greater than those set forth in Table I as the minimum properties realized thereby:

Table I

| | |
|---|---|
| Dry tensile strength | 35 p.s.i. @ 12"/min. pull. |
| Wet tensile strength | 35 p.s.i. in water @ 71–75° F. for six hours. |
| Tear resistance | 450 gms. in weakest direction (Elemendorf tear tester). |
| Adhesion | 25 oz. to plastic panels, 25 oz. to backing. |
| MVTR | 5.6 gms./100 sq. in./24 hrs. |
| Water, T.R. | 30 gms./100 sq. in./24 hrs. |

It is of course understood that the several procedures, techniques and structures herein described and illustrated are intended to exemplify the present invention rather than limit it and its scope shall include such variations and modifications as may occur without departing from the spirit of this invention, especially as it is defined by the claims appended hereto.

What is claimed is:

1. The method of fabricating a laminated pressure-sensitive adhesive tape comprising: coating one surface of a textile fabric backing sheet with a thin layer of a laminating adhesive; drying said layer of laminating adhesive upon said surface; engaging said dried layer with a thin polyfilm under tension without having residual tension therein; coating another surface of said fabric backing sheet with a thin layer of pressure-sensitive adhesive to form an article therewith; rapidly heating said article to a first temperature in excess of the fusion temperature of said polyfilm; maintaining said article at said first temperature until said polyfilm becomes soft and substantially completely fused; cooling said article to a second temperature which is less than said fusion temperature and approximately the normal drying temperature of said pressure-sensitive adhesive; maintaining said article at said second temperature until said pressure-sensitive adhesive dries and said soft fused polyfilm becomes a tough plastic coating; and cooling the article to room temperature.

2. The method of fabricating a laminated pressure-sensitive adhesive tape comprising: coating one surface of a textile fabric backing sheet with a thin layer of a laminating adhesive; drying said layer of laminating adhesive upon said surface; engaging said dried layer with a thin film of polyethylene which is under tension without having residual tension therein; coating another surface of said fabric backing sheet with a thin layer of pressure-sensitive adhesive to form an article therewith; rapidly heating said article to a first temperature in excess of the fusion temperature of said polyethylene; maintaining said article at said first temperature until said polyethylene becomes soft and substantially completely fused; cooling said article to a second temperature which is less than said fusion temperature and approximately the normal drying temperature of said pressure-sensitive adhesive; maintaining said article at said second temperature until said pressure-sensitive adhesive dries and said soft fused polyethylene becomes a tough plastic coating; and cooling the article to room temperature.

3. The method of fabricating a laminated pressure-sensitive adhesive tape comprising: coating one surface of a textile fabric backing sheet with a thin layer of a laminating adhesive; drying said layer of laminating adhesive upon said surface; engaging said dried layer with a thin film of linear low density polyethylene which is under tension without having residual tension therein; coating another surface of said fabric backing sheet with a thin layer of pressure-sensitive adhesive to form an article therewith; rapidly heating said article to a first temperature in excess of the fusion temperature of said linear low density polyethylene; maintaining said article at said first temperature until said polyethylene becomes soft and substantially completely fused; cooling said article to a second temperature which is less than said fusion temperature and approximately the normal drying temperature of said pressure-sensitive adhesive; maintaining said article at said second temperature until said pressure-sensitive adhesive dries and said soft fused polyethylene becomes a tough plastic coating; and cooling the article to room temperature.

4. The method of fabricating a laminated pressure-sensitive adhesive tape comprising: coating one surface of an untreated cotton sheet with from about 55 to about 70 pounds per ream of a laminating adhesive of the stabilized rubber-resin type; heating said coated sheet to dry said adhesive thereto; passing the dry coated sheet into a windup while simultaneously introducing a film of 2 mil low density polyethylene having at least one oxidized surface into the windup therewith, said oxidized surface of said film being in intimate bonding engagement with said dry laminating adhesive; coating another surface of said sheet with from about 50 to about 90 pounds per ream of a solvent based pressure-sensitive adhesive to form an article therewith; rapidly heating said article to a first temperature in excess of the fusion temperature of said low density polyethylene; maintaining said article at said first temperaure until said polyethylene becomes soft and substantially completely fused and substantially all diffusible solvent is dispelled from said adhesive; cooling said article to a second temperature which is less than said fusion temperature and approximates the normal drying temperature of said pressure-sensitive adhesive; maintaining said article at said second temperature until said pressure-sensitive adhesive dries and said soft fused polyethylene becomes a tough plastic coating; and cooling the article to room temperature.

5. The method of fabricating a laminated pressure-sensitive adhesive tape compirsing: coating one surface of an untreated cotton sheet with a laminating adhesive of the stabilized rubber-resin type; heating said coating sheet to dry said adhesive thereto; passing the dry coated sheet into a windup while simultaneously introducing a film of low density polyethylene having at least one oxidized surface into the windup therewith, said oxidized surface of said film being in intimate bonding engagement with said dry laminating adhesive; coating another surface of said sheet with a solvent based pressure-sensitive adhesive to form an article therewith; rapidly heating said article to a first temperature in excess of the fusion temperature of said low density polyethylene; maintaining said article at said first temperature until said polyethylene becomes soft and substantially completely fused and substantially all diffusible solvent is dispelled from said adhesive; cooling said article to a second temperature which is less than said fusion temperature and approximates the normal drying temperature of said pressure-sensitive adhesive; maintaining said article at said second temperature until said pressure-sensitive adhesive dries and said soft fused polyethylene becomes a tough plastic coating; and cooling the article to room temperature.

6. The method of fabricating a laminated pressure-sensitive adhesive tape comprising: coating one surface of an untreated cotton sheet with a laminating adhesive of the stabilized rubber-resin type; heating said coated sheet to dry said adhesive thereto; passing the dry coated sheet into a windup while simultaneously introducing a film of polyethylene into the windup therewith in intimate bonding engagement with said dry laminating adhesive; coating another surface of said sheet with a solvent based pressure-sensitive adhesive to form an article therewith; rapidly heating said article to a first temperature in excess of the fusion temperature of said polyethylene; maintaining said article at said first temperature until said polyethylene becomes soft and substantially completely fused and substantially all diffusible solvent is dispelled from said adhesive; cooling said article to a second temperature which is less than said fusion temperature and approximates the normal drying temperature of said pressure-sensitive adhesive; maintaining said article at said second temperature until said pressure-sensitive adhesive dries and said soft fused polyethylene becomes a tough plastic coating; and cooling the article to room temperature.

References Cited in the file of this patent

UNITED STATES PATENTS

| | | |
|---|---|---|
| 2,561,063 | McBurney et al. | July 17, 1951 |
| 2,804,416 | Phillipsen | Aug. 27, 1957 |

FOREIGN PATENTS

| | | |
|---|---|---|
| 215,448 | Australia | Nov. 29, 1956 |
| 218,213 | Australia | Jan. 9, 1958 |